US008660591B2

(12) United States Patent
Wen (10) Patent No.: US 8,660,591 B2
(45) Date of Patent: Feb. 25, 2014

(54) TERMINAL AND NO-DISTURBANCE METHOD THEREOF

(75) Inventor: Yongming Wen, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 13/131,147

(22) PCT Filed: Dec. 29, 2008

(86) PCT No.: PCT/CN2008/073834
§ 371 (c)(1),
(2), (4) Date: May 25, 2011

(87) PCT Pub. No.: WO2010/060251
PCT Pub. Date: Jun. 3, 2010

(65) Prior Publication Data
US 2011/0244895 A1 Oct. 6, 2011

(30) Foreign Application Priority Data
Nov. 30, 2008 (CN) .......................... 2008 1 0183395

(51) Int. Cl.
*H04W 4/00* (2009.01)

(52) U.S. Cl.
USPC ........ 455/466; 455/574; 455/522; 455/435.1; 370/462; 370/349

(58) Field of Classification Search
USPC ........... 455/466, 435.1, 435.2, 574, 433, 522; 379/142.06, 233, 196, 88.12, 903, 379/373.02, 245, 211.01, 201.01; 370/347, 370/522, 462, 329, 349; 358/440, 400
See application file for complete search history.

(56) References Cited

U.S. PATENT DOCUMENTS 5,592,533 A * 1/1997 McHenry et al. .......... 455/435.2
5,594,951 A * 1/1997 Bellin .......................... 455/574
5,752,201 A * 5/1998 Kivari .......................... 455/574
6,157,633 A * 12/2000 Wright ......................... 370/349
6,236,853 B1   5/2001 Mee et al.
(Continued)

FOREIGN PATENT DOCUMENTS

| CN | 1719916 | | 1/2006 |
|---|---|---|---|
| CN | 1747587 | | 3/2006 |
| CN | 1929517 | | 3/2007 |
| GB | 2313265 A | * | 11/1997 |
| JP | H11355850 A | | 12/1999 |
| JP | 2000151455 A | | 5/2000 |
| JP | 2001053874 A | | 2/2001 |
| JP | 2002204476 A | | 7/2002 |
| JP | 2003134558 A | | 5/2003 |
| JP | 2008512186 A | | 4/2008 |
| JP | 2009520427 A | | 5/2009 |
| WO | 9920065 | | 4/1999 |
| WO | 2007072329 | | 6/2007 |

OTHER PUBLICATIONS

English Translation of the Written Opinion of the International Search Authority in international application No. PCT/CN2008/073834, mailed on Aug. 6, 2009.
International Search Report in international application No. PCT/CN2008/073834 mailed on Aug. 6, 2009.
Supplementary European Search Report in European application number: 08878368.3, mailed on Mar. 26, 2012.

*Primary Examiner* — Mahendra Patel
(74) *Attorney, Agent, or Firm* — Oppedahl Patent Law Firm LLC (57) ABSTRACT

A terminal and the no-disturbance method thereof are provided, the method comprises: the terminal sends a power-off registration message to the network side, and completes the power-off registration process; in the case that a voice or short message calls the terminal, the network side returns a prompt that the terminal has been powered off to the calling party. By the processing above, it is ensured that in the case of initiating a call and sending short messages normally, the terminal can effectively prevent the user from being disturbed, and return a prompt that the terminal has been powered off to the calling party.

4 Claims, 8 Drawing Sheets

(56) References Cited

U.S. PATENT DOCUMENTS

| | | | |
|---|---|---|---|
| 6,236,859 B1* | 5/2001 | Morper | 455/435.1 |
| 6,240,304 B1* | 5/2001 | Blankenstein et al. | 455/574 |
| 6,611,516 B1* | 8/2003 | Pirkola et al. | 455/466 |
| 8,041,020 B2* | 10/2011 | Drewry et al. | 379/211.01 |
| 2001/0050907 A1* | 12/2001 | Madour et al. | 370/329 |
| 2002/0094832 A1* | 7/2002 | Lee | 455/435 |
| 2002/0111167 A1* | 8/2002 | Nguyen et al. | 455/435 |
| 2002/0116461 A1* | 8/2002 | Diacakis et al. | 709/204 |
| 2002/0120687 A1* | 8/2002 | Diacakis et al. | 709/204 |
| 2004/0203776 A1* | 10/2004 | Jun | 455/435.1 |
| 2004/0259540 A1 | 12/2004 | Banerjee | |
| 2007/0197212 A1* | 8/2007 | Marsico et al. | 455/433 |
| 2008/0214187 A1 | 9/2008 | Im | |
| 2009/0181647 A1* | 7/2009 | Benco et al. | 455/413 |
| 2009/0204717 A1 | 8/2009 | Manigandan | |
| 2010/0087213 A1* | 4/2010 | Lemberg | 455/466 |

\* cited by examiner

Fig. 1

PRIOR ART

Fig. 2

PRIOR ART

Fig. 3

PRIOR ART

TERMINAL AND NO-DISTURBANCE METHOD THEREOF

CROSS-REFERENCE TO RELATED APPLICATIONS

This application is the U.S. National Stage of International Patent Application No. PCT/CN2008/073834 filed on Dec. 29, 2008, which claims priority to Chinese Patent Application Number 200810183395.8 filed on Nov. 30, 2008, the disclosures of which are hereby incorporated by reference in their entireties.

TECHNICAL FIELD

The present invention relates to the field of communications, particularly to a terminal and its no-disturbance method.

BACKGROUND

Currently, as wireless communication systems develop and become increasingly popular, wireless communication has brought convenience to our life; on the other hand, it has also caused our privacy to be infringed. In actual applications, during some particular time, a terminal user requires to set a terminal to be in a no-disturbance state under the circumstances that normal use of the terminal (such as calling or short messaging) is not affected.

Figure 1:
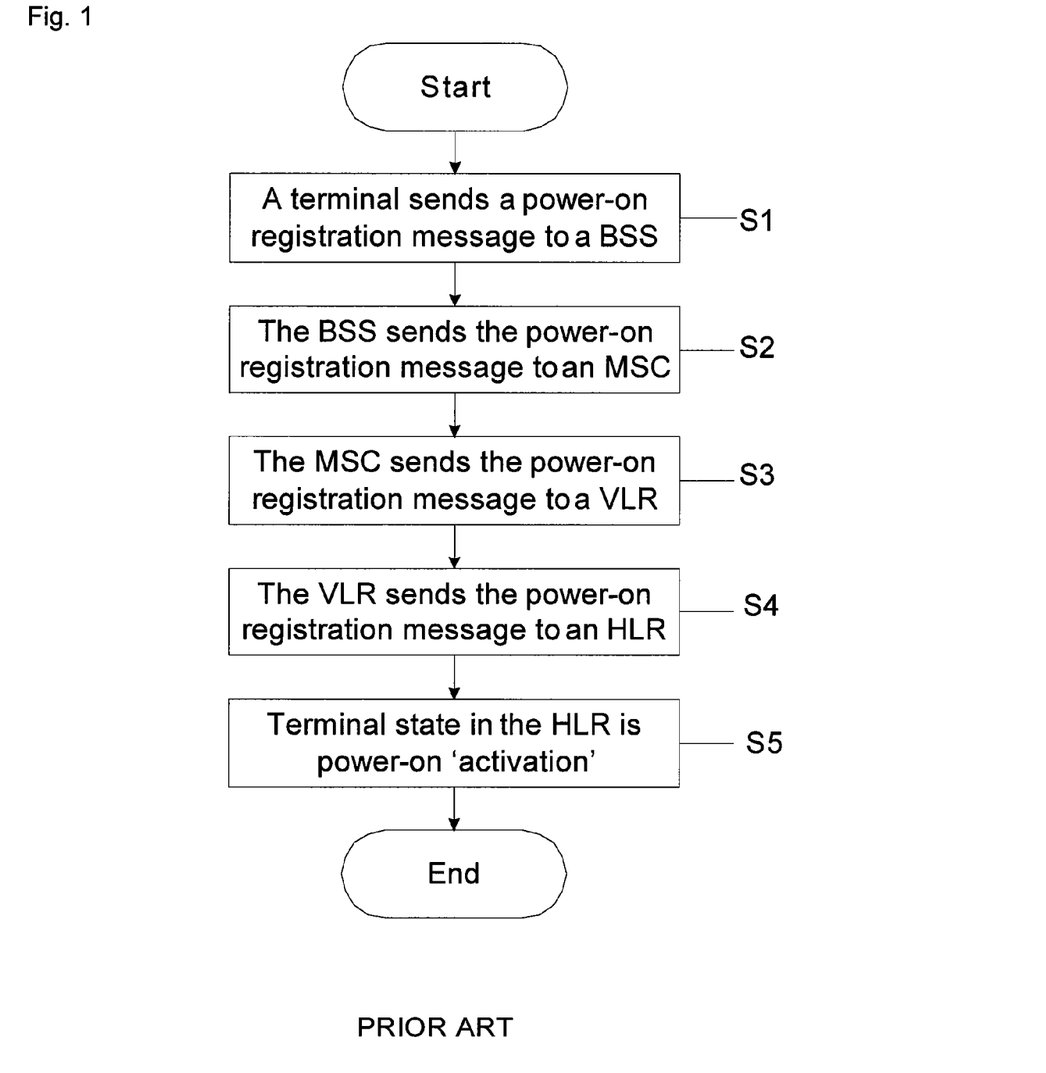
FIG. 1 is a flowchart of a terminal performing power-on registration with a network in related technologies.

In wireless communication networks, there is a mechanism that allows a terminal to register with a network, and the mechanism enables the network to perform highly efficient management on the terminal. FIG. 1 illustrates a flow of a terminal performing power-on registration with a network in related technologies, as shown in FIG. 1, the processing of a terminal registering with a network comprises: S1, a terminal sends a power-on registration message to a Base Station Subsystem (BSS); S2, the BSS sends the power-on registration message to a Mobile Switching Centre (MSC); S3, the MSC sends the power-on registration message to a Visitor Location Register (VLR); S4, the VLR sends the power-on registration message to a Home Location Register (HLR); and S5, the HLR, in its local database, sets the state of the terminal as a power-on 'activation' state.

In related technologies, when the state of the terminal changes or exceeds a certain period of time, the terminal requires to send a signaling message (or called a registration message) to the network through an air interface, the signaling message is used by the terminal to report its own state information to the network (i.e. used for registering with the network) so that the network can get to know the latest state of the terminal. Registration types commonly used at present comprise:

1. power-on registration: when the user powers on the terminal, the terminal sends a power-on registration message to the network, notifying the network that the terminal has been already powered on now and can receive telephone calls and short messages;

2. power-off registration: when the user powers off the terminal, the terminal sends a power-off registration message to the network, notifying the network that the terminal has been already powered off now and cannot receive telephone calls and short messages;

3. time-based registration: beyond a certain period of time following the last registration with the network, the terminal will send a regular registration message to the network, notifying the network of the latest state of the terminal;

4. distance-based registration: after the terminal's last registration with the network, if the terminal has moved beyond a certain distance, then the terminal will send a location registration message to the network, notifying the network of the latest location and other information of the terminal;

5. parameter change registration: when key parameters of the terminal have changed, the terminal will send a parameter change registration message to the network, notifying the network of the latest parameter information of the terminal;

6. zone update registration: when the terminal roams into a new zone or leaves the current zone, the terminal will send a zone registration message to the network, notifying the network of the latest information of the terminal; and 7. command registration: if the network requires to immediately know the information of the terminal and has been waiting too long due to the above-mentioned reasons for the terminal to send a registration message, then the network can send a command registration message to the terminal, requiring the terminal to immediately send a registration message and report the information of terminal.

In addition to the above-mentioned 7 types of registration messages, there are still other registration methods that do not require interaction of registration messages, which comprises:

8. network access registration: if the user has used the terminal to initiate a call to the network or has sent a short message, then the network can acquire current information of the terminal through the process of the user accessing the network, and the network would believe that the terminal has already implicitly registered with the network during the network access of this time; and 9. state inquiry registration: the network sends a state inquiry signaling to the terminal, the terminal feeds back a state response signaling to the network, and the network can infer state information of the terminal from the state response signaling.

Figure 2:
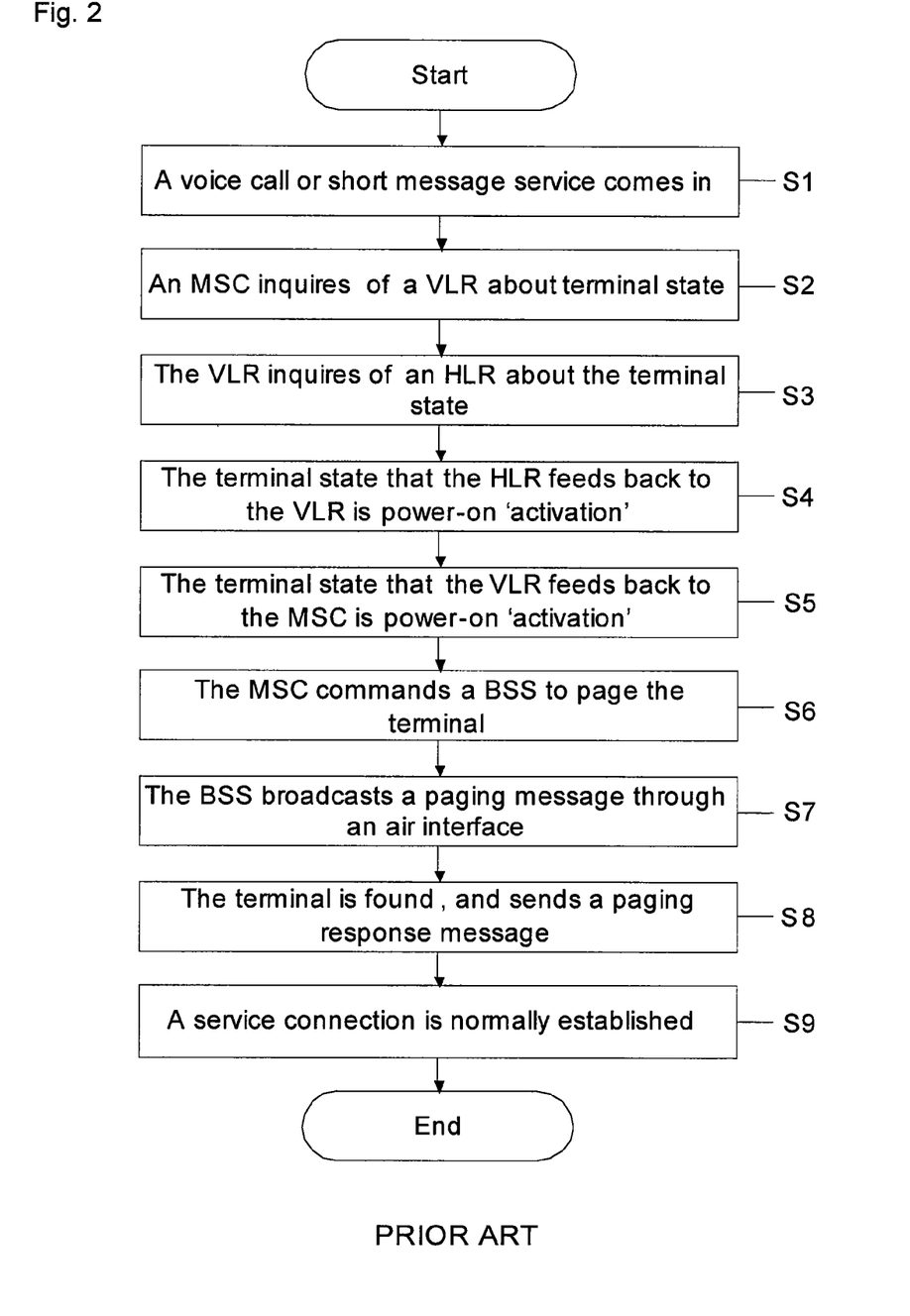
FIG. 2 is a network processing flowchart when services call a terminal in related technologies.

In related technologies, the network stores registration information of the terminal inside the HLR or VLR, if the terminal is located within a home network, then the HLR will store current information of the terminal; if the terminal has roamed into another network, then the VLR will store current information of the terminal. Under the circumstances that there are calls or short messages, the MSC will inquire of the HLR or VLR about the terminal's current information. FIG. 2 illustrates a network processing flow during a service calling a terminal in related technologies, as shown in FIG. 2, under the circumstances that there are calls or short messages, the network processing flow comprises: S1, a calling party sends a voice call or a short message; S2, the MSC inquires of the VLR about the state of the terminal; S3, the VLR inquires of the HLR about the state of the terminal; S4, the state of the terminal that the HLR feeds back to the VLR is a power-on 'activation' state; S5, the state of the terminal that the VLR feeds back to the MSC is a power-on 'activation' state; S6, the MSC commands the BSS to page the terminal; S7, the BSS broadcasts a paging message through the air interface; S8, after the BSS has paged the terminal, the terminal returns a paging response message to the BSS; and S9, the terminal starts to normally establish a service connection.

Figure 3:
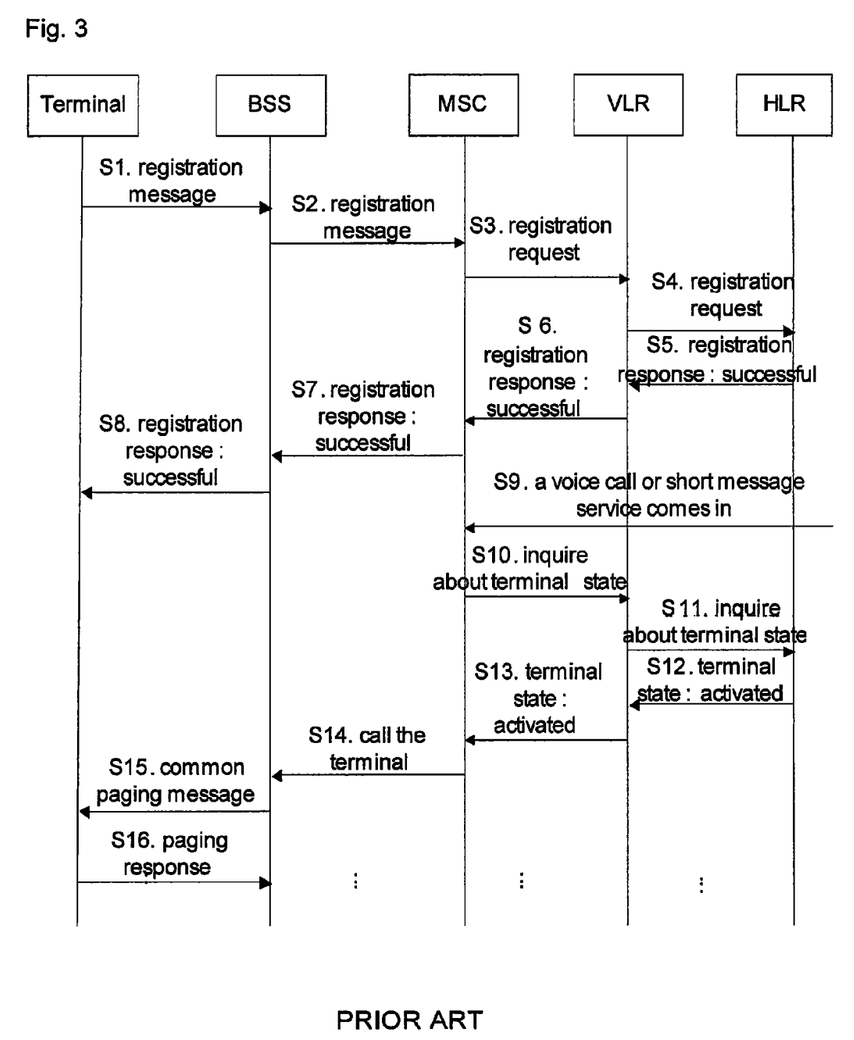
FIG. 3 is a signaling flowchart of normal terminal registration and network processing in related technologies.

In related technologies, if the terminal is currently in a power-off state, then for a call service, the network will prompt the calling party with a piece of information that the called party has powered the terminal off; for a short message service, the network will temporarily store the short message in a Message Centre (MC) and forward it when the terminal is powered on the next time. If the terminal is currently in an activated (powered-on) state, the MSC will page the terminal through the BSS. FIG. 3 is a signaling flowchart illustrating that the terminal normally registers with the network and the network pages the terminal in related technologies, as shown in FIG. 3, it comprises the following processing:

S1, the terminal (or called a Mobile Station (MS)) sends a registration message to the BSS; S2, the BSS sends the registration message to the MSC; S3, the MSC sends the registration message to the VLR; S4, the VLR sends a registration request to the HLR; S5, the HLR returns a registration-successful response message to the VLR; S6, the VLR returns the registration-successful response message to the MSC; S7, the MSC returns the registration-successful response message to the BSS; S8, the BSS returns the registration-successful response message to the MS; S9, a voice call or short message service calls the MS through the MSC; S10, after receiving the call, the MSC inquires of the VLR about the state of the terminal; S11, the VLR inquires of the HLR about the state of the terminal; S12, the HLR returns the VLR a response message that the terminal is in an activated state; S13, the VLR returns the MSC the response message that the terminal is in an activated state; S14, the MSC calls the MS through the BSS; S15, the BSS sends a common paging message to the MS; and S16, the MS returns a paging response message to the BSS.

During the above-mentioned processing, S4, S5, S11 and S12 are optional processes, because it is not necessary to inquire of the HLR if there is state information of the terminal stored in the VLR.

In related technologies, if the user wishes to shield incoming calls or short messages so as not to be disturbed during a certain time, while the user himself can still use the network normally to make calls or send short messages, then he/she will set a traditional no-disturbance function in the terminal; however, if the user sets the traditional no-disturbance function, then generally the terminal at the calling party will hear a prompt tone that the called party temporarily cannot receive the call. However, the user does not wish the calling party to hear such prompt tone in some cases, but wishes the calling party to hear a prompt tone that the called party has powered his/her MS off. No technical solution has been proposed now that can effectively solve the above-mentioned problems.

SUMMARY

The present invention is proposed to address the problem that a system cannot prompt that a terminal has been powered off and therefore cannot prevent the user from being disturbed when other users call the terminal under the circumstances that the terminal can normally initiate calls and send short messages even if it is in a no-disturbance state, for this reason, the main object of the present invention is to provide an improved terminal no-disturbance solution to resolve at least one of the above-mentioned problems in related technologies.

In order to achieve the above-mentioned object, a terminal no-disturbance method is provided according to one aspect of the present invention.

The terminal no-disturbance method according to the present invention comprises: a network side acquires a power-off registration message from a terminal and performs power-off registration; and if there are communication services in which the terminal is a called party, then the network side returns a calling party a prompt that the terminal has been powered off.

Furthermore, before the terminal sends the power-off registration message to the network side, the method may further comprise: a user sets the state of the terminal to be a no-disturbance state through a user interface.

Furthermore, after the terminal finishes the power-off registration process, the method may further comprise: the terminal is forbidden from sending registration messages to the network side except the power-off registration message.

Furthermore, under the circumstances that the user makes a telephone call or sends a short message through the terminal, the method may further comprise: after the user completes making a telephone call or sending a short message through the terminal, the terminal immediately sends the power-off registration message to the network side and makes a request for the power-off registration.

Wherein the operation of the terminal sending the power-off registration message to the network side and completing the power-off registration process may specifically comprise: the terminal sends the power-off registration message to an MSC through a BSS; the MSC forwards the power-off registration message to an HLR through a VLR; and the HLR, in its local database, updates the stated of the terminal to a power-off state.

Wherein the operation of the network side returning the calling party a prompt that the terminal has been powered off may specifically comprise: under the circumstances that there is a voice or short message calling the terminal, the MSC inquires of the HLR about the state information of the terminal through the VLR; the HLR checks the local database, and returns the power-off state of the terminal to the MSC through the VLR; and the MSC returns the calling party a prompt that the terminal has been powered off.

A terminal is provided according to another aspect of the present invention.

The terminal according to the present invention comprises: a setup module, which is used for setting the state of the terminal to be a no-disturbance state; and a sending module, which is used for sending a power-off registration message to a network side and making a request for power-off registration.

Furthermore, the above-mentioned terminal may further comprise: a control module, which is used for forbidding the sending module to send registration messages to the network side except the power-off registration message.

Furthermore, the above-mentioned terminal may further comprise: a scheduling module, which is used for scheduling the sending module to send the power-off registration message to the network side after the user completes making a telephone call or sending a short message through the terminal that has finished power-off registration.

The technical scheme of the present invention can be used, by sending a power-off registration message to the network side, meanwhile, forbidding sending other registration messages, to solve the problem that the system cannot prompt that the terminal has been powered off and therefore cannot prevent the user from being disturbed when other users call the terminal under the circumstances that the terminal can normally initiate calls and send short messages in related technologies, thus the technical scheme can ensure effectively the user against disturbance and return the calling party a prompt that the terminal has been powered off under the circumstances that the terminal can normally initiate calls and send short messages.

Other characteristics and advantages of the prevent invention will be discussed in the subsequent description, and will become obvious partly via the description or become understood via embodiments of the present invention. The purpose and other advantages of the present invention can be achieved and acquired through the authored description, claims and the structure particularly illustrated in the drawings.

BRIEF DESCRIPTION OF THE DRAWINGS

The drawings are used to provide further understanding of the present invention, constitute a part of the description and are used together with the embodiments of the present invention to explain the present invention, and do not constitute any limitation on the present invention. In the drawings.

DETAILED DESCRIPTION

Functional Overview

In related technologies, the user wishes to shield incoming calls or short messages during a certain time, but at the same time wishes the calling party to hear a prompt tone that the called party has powered the terminal off; regarding such requirements, the present invention provides a method that in wireless networks the user can initiate network services such as making telephone calls and sending short messages when the user has set terminal's current registration state to be a power-off state; in other words, after the user has made a no-disturbance setting, the terminal can normally initiate calls and send short messages, meanwhile the system prompts that the called terminal has been powered off when other users call the terminal; when there is a short message coming in, the network will not send the short message to the terminal, but temporarily store the short message, wait for the user to exit the above-mentioned special state, and then forward the short message to the terminal.

The preferred embodiments of the present invention are described below in combination with the drawings; it should be understood that the preferred embodiments described here are only used to describe and explain the present invention rather than restrict the present invention. If there is no conflict, the embodiments of the present invention and the characteristics in the embodiments can be combined with each other.

Method Embodiment

Figure 4:
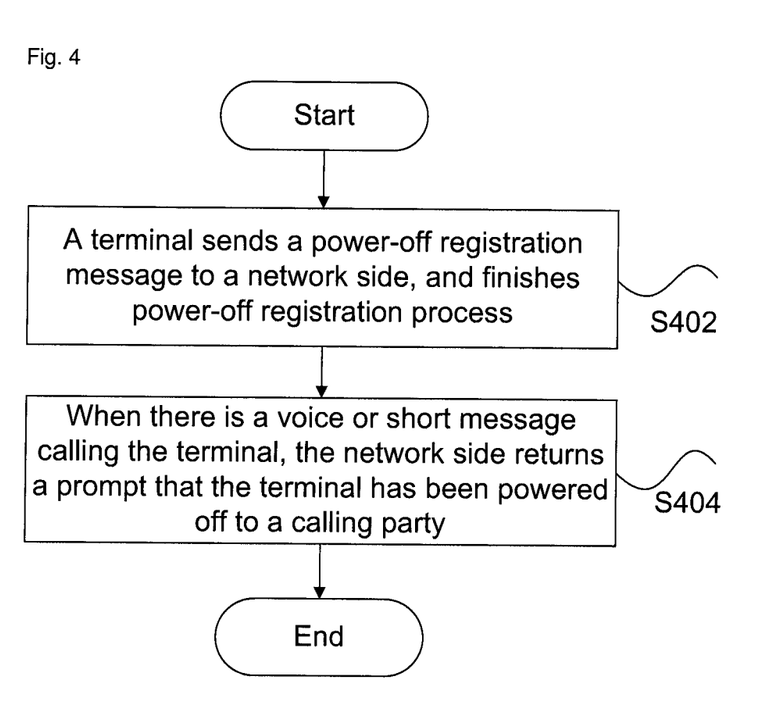
FIG. 4 is a flowchart of a terminal no-disturbance method according to an embodiment of the present invention.

According to the embodiment of the present invention, a terminal no-disturbance method is provided; FIG. 4 is a flowchart of a terminal no-disturbance method according to the embodiment of the present invention, as shown in FIG. 4, the method comprises the following processing (S402-S404).

First, a user no-disturbance mode is preset in the terminal, by selecting the mode, a user no-disturbance operating mode can be opened or closed, when the user requires to start this no-disturbance function, before executing the processing as shown in FIG. 4, the user first requires to set the state of the terminal as a no-disturbance state through the user interface.

S402: after the user has set the terminal to operate in the no-disturbance operating state through the user interface, the terminal will immediately send a power-off registration message to the network side to notify the network to immediately update the state of the terminal to a power-off state and complete the power-off registration process.

When the terminal is in the special no-disturbance operating state, after the terminal has completed the power-off registration process, it must also forbid sending the network side registration messages except the power-off registration message; in other words, the terminal will no longer send the network side any registration message including power-on, time-based, distance-based, parameter change, zone update, command and state inquiry registration messages, and, when receiving a registration command from the network side and when the normal registration condition is triggered, the terminal also forbids making any response, thereby being capable of keeping itself in the power-off registration state.

Specifically, in S402, the processing of the terminal sending a power-off registration message to the network and completing the power-off registration process comprises: first, the terminal sends a power-off registration message to the MSC through the BSS; then the MSC forwards the power-off registration message to the HLR through the VLR; at last, the HLR updates the state of the terminal to a power-off state in the local database.

Furthermore, following S402, if the user requires to make a telephone call or send a short message through the terminal, then after the user completes making the telephone call or sending the short message, the terminal will immediately send a power-off registration message to the network and finish the power-off registration process, i.e. every time after the user finishes a network access operation, the terminal always will immediately send a power-off registration message to the network. The terminal is required to actively initiate a power-off registration to change the state of the terminal to a power-off state because after the terminal finishes a network access process, the network would believe that the terminal has performed a network access registration and would change the state of the terminal to a power-on state.

Figure 5:
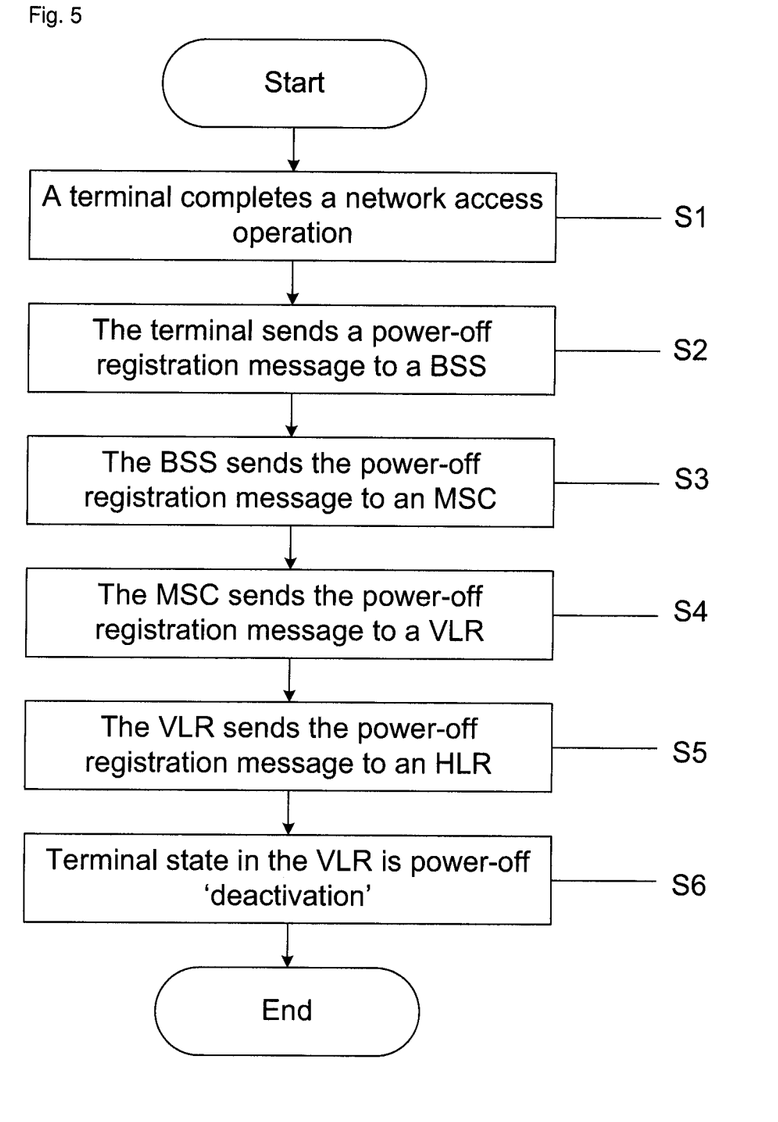
FIG. 5 is a processing flowchart of a terminal performing power-off registration with a network according to an embodiment of the present invention.

The process of the user sending a power-off registration message to the network after finishing a network access operation is explained in detail below in combination with the drawings, as shown in FIG. 5, it comprises the following processing: S1, the terminal finishes a network access operation, such as making a telephone call or sending a short message; S2, the terminal sends a power-off registration message to the BSS; S3, the BSS sends the power-off registration message to the MSC; S4, the MSC sends the power-off registration message to the VLR; S5, the VLR sends the power-off registration message to the HLR; and S6, the state of the terminal in the HLR is a power-off 'deactivation' state.

S404: under the circumstances that there is a voice or short message calling the terminal, the network side returns the calling party a prompt that the terminal has been powered off.

Figure 6:
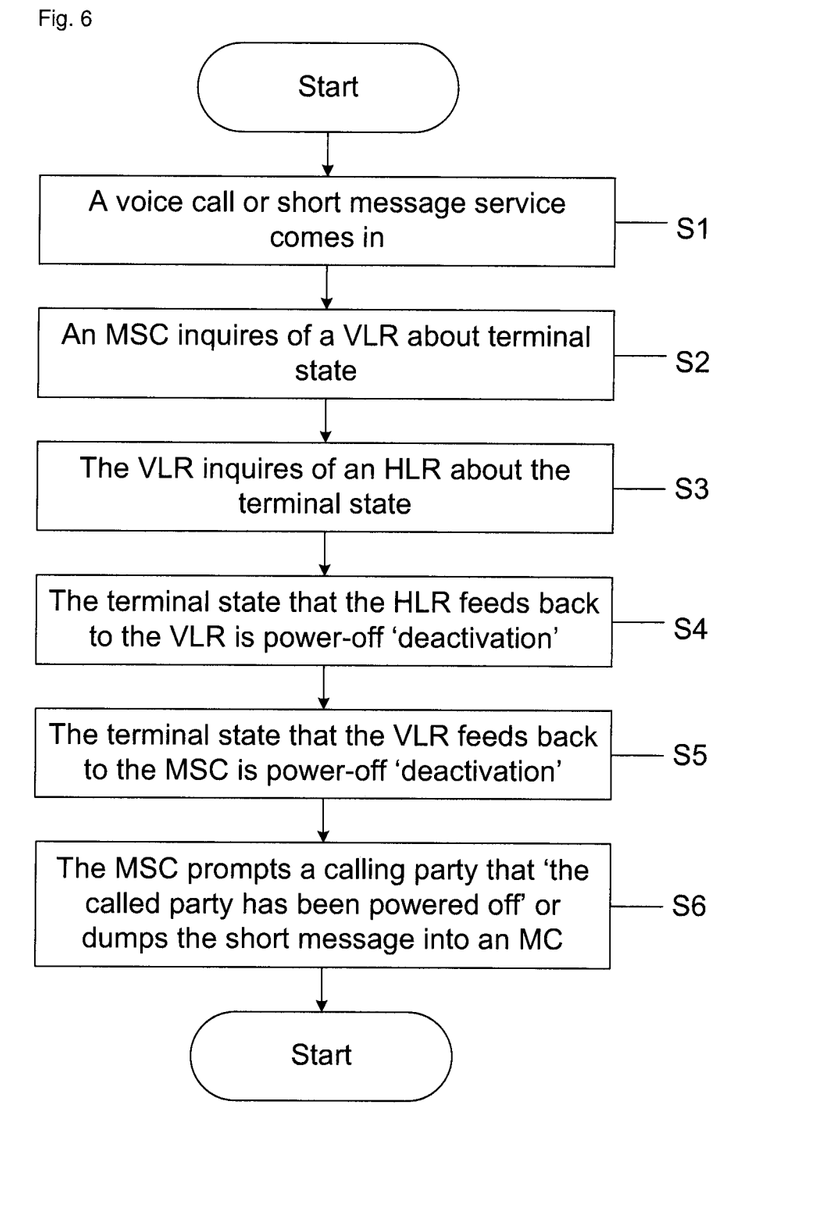
FIG. 6 is a network processing flowchart when services call a terminal according to an embodiment of the present invention.

In S404, as shown in FIG. 6, the specific processing of the network side returning the calling party a prompt that the terminal has been powered off comprises: S1, the calling party makes a voice or short message call to the terminal; S2, the MSC inquires of the VLR about the state information of the terminal; S3, the VLR inquires of the HLR about the state information of the terminal; S4, the HLR checks the local database, and returns the power-off state of the terminal to the VLR; S5, the VLR returns the power-off state of the terminal to the MSC; and S6, the MSC returns the calling party a prompt that the terminal has been powered off.

Figure 7:
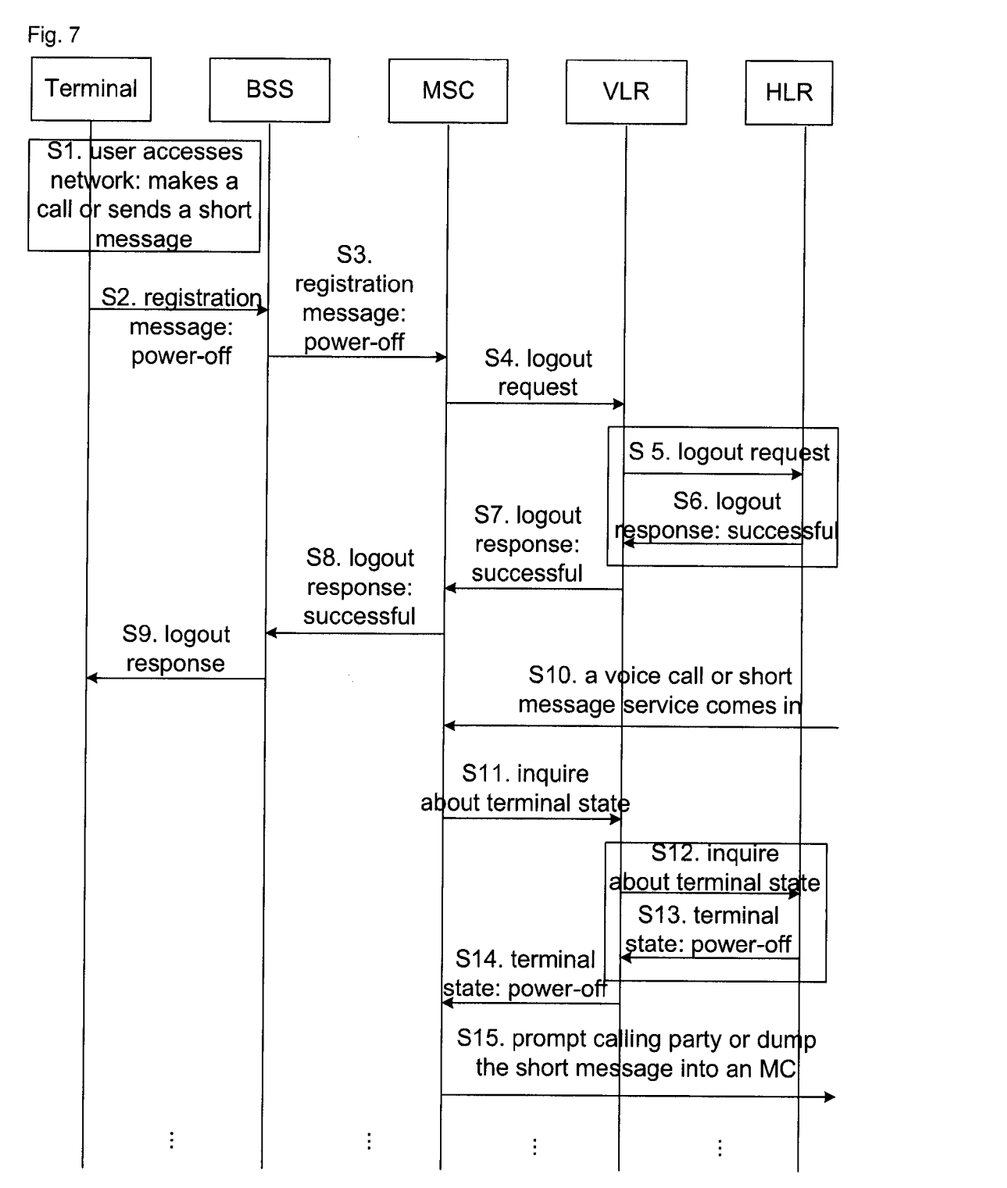
FIG. 7 is a signaling flowchart of terminal power-off registration and network processing according to an embodiment of the present invention.

Based on the above descriptions, the detailed process of the terminal no-disturbance method of the present invention is explained in detail below in combination with FIG. 7. FIG. 7 is a detailed processing signaling flowchart of the terminal no-disturbance method according to an embodiment of the present invention, as shown in FIG. 7, it comprises the following processing:

S1, the MS accesses the network, and makes a telephone call or sends a short message;

S2, the MS sends a power-off registration message to the BSS;

S3, the BSS sends the power-off registration message to the MSC;

S4, the MSC sends the power-off registration message to the VLR;

S5, the VLR sends the power-off registration message to the HLR;

S6, the HLR returns a poweroff-registration-successful response message to the
VLR;

S7, the VLR returns the poweroff-registration-successful response message to the MSC;

S8, the MSC returns the poweroff-registration-successful response message to the BSS;

S9, the BSS returns the poweroff-registration-successful response message to the MS (S2-S9 correspond to S402 in FIG. 4);

S10, the calling party initiates a voice call or short message service to the MSC to page the MS;

S11, the MSC inquires of the VLR about an MS state;

S12, the VLR inquires of the HLR about the MS state;

S13, the HLR returns the VLR a response message that the MS state is power-off;

S14, the VLR returns the MSC a response message that the MS state is an activated state; and S15, the MSC prompts the calling party that the MS has been powered off, or dumps the short message into the MC (corresponding to S404 in FIG. 4).

Through the above-mentioned processing, it can be ensured that the terminal can effectively prevent the user from being disturbed and return the calling party a prompt that the terminal has been powered off under the circumstances that the terminal initiates calls and sends short messages normally.

Device Embodiment

Figure 8:
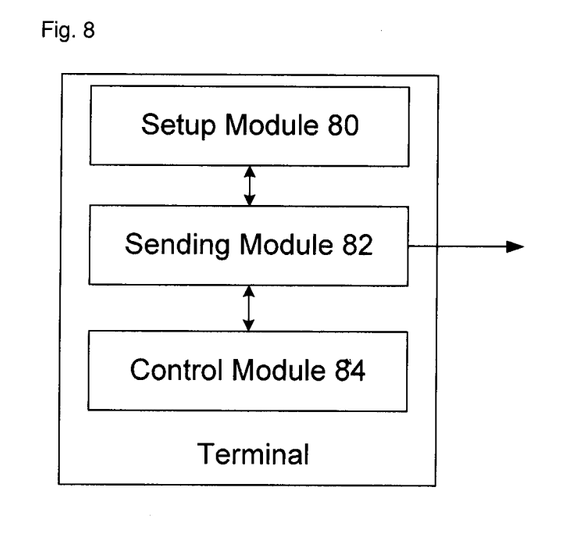
FIG. 8 is a block diagram of a terminal according to an embodiment of the present invention.

According to an embodiment of the present invention, a terminal is provided;

FIG. 8 is a block diagram of the terminal according to an embodiment of the present invention, as shown in FIG. 8, the terminal comprises a setup module 80, a sending module 82, and a control module 84. The terminal according to an embodiment of the present invention is explained in detail below.

The setup module 80, which is used for presetting a user no-disturbance mode in the terminal, by selecting the mode, the user can start or end the user no-disturbance operating mode, i.e. when the user requires to start this no-disturbance function, the setup module 80 sets the terminal to be in the no-disturbance mode.

The sending module 82, which is connected to the setup module 80, and is used for sending a power-off registration message to the network side and finishing the power-off registration process after the setup module 80 sets the terminal to be in the no-disturbance operating state. And, after the user completes making a telephone call or sending a short message through the terminal, the sending module 82 must immediately send a power-off registration message to the network and finish the power-off registration process, i.e. every time after the user finishes a network access operation, the sending module 82 always will immediately send a power-off registration message to the network. The sending module 82 is required to actively initiate a power-off registration operation to change the state of the terminal to a power-off state because after the terminal finishes a network access process, the network would believe that the terminal has performed a network access registration and would change the state of the terminal to a power-on state. Preferably, the terminal can further comprise: a scheduling module (not shown in FIG. 8), which is used for scheduling the sending module to send the power-off registration message to the network side after the user completes making a telephone call or sending a short message through the terminal that has finished the power-off registration.

The control module 84, which is connected to the sending module 82, and is used for forbidding the sending module 82 to send the network side registration messages except the power-off registration message. In other words, the control module 84 controls the sending module 82 so that it no longer sends the network side registration messages, including power-on, time-based, distance-based, parameter change, zone update, command and state query registration messages, and, when the terminal receives a registration command from the network side and when the normal registration condition is triggered, the control module 84 also forbids the sending module 82 to make any response, thereby being capable of keeping the terminal in the power-off registration state.

It is necessary to note that the above-mentioned individual modules can be changed and combined in different ways without departing from the spirit and scope clarified in the attached claims.

In summary of the above, the technical scheme of the present invention can be used, by sending a power-off registration message to the network side and at the same time forbidding sending other registration messages, to solve the problem that the system cannot prompt that the called terminal has been powered off and therefore cannot prevent the user from being disturbed when other users call the terminal under the circumstances that the terminal can normally initiate calls and send short messages in related technologies, and thus the technical scheme can ensure effectively the user against disturbance and return the calling party a prompt that the terminal has been powered off under the circumstances that the terminal can normally initiate calls and send short messages.

The above-mentioned are just the preferred embodiments of the present invention and are in no way intended to restrict the present invention; for those skilled in the art, the present invention can have various changes and variations. Any and all modifications, equivalent substitutes, and improvements, etc, made within the spirit and principle of the present invention shall all be included into the scope of protection of the present invention.

What is claimed is:

1. A method for blocking a terminal from receiving incoming communications without turning off the terminal, comprising:

setting, by a user, a state of a terminal to be a no-disturbance state, in which the terminal remains in a power-on state, can normally initiate calls and send short messages and cannot receive incoming communications, through a user interface of the terminal;

transmitting, by the terminal, a power-off registration message to a network side in response to the setting of the state of the terminal to be the no-disturbance state, and remaining powered on after transmitting the power-off registration message;

acquiring, by the network side, the power-off registration message from the terminal, and performing power-off registration, such that if there are communication services in which the terminal is a called party, then the network side returning a calling party a prompt that the terminal has been powered off;

if the user makes a telephone call or sends a short message through the terminal in the no-disturbance state, after the user completes making the telephone call or sending the short message, immediately transmitting, by the terminal, the power-off registration message to the network side and remaining powered on after transmitting the power-off registration message; and after the terminal finishes the power-off registration process, forbidding the terminal from sending registration messages to the network side except the power-off registration message.

2. The method according to claim 1, wherein the operation of the terminal sending the power-off registration message to the network side and completing the power-off registration process comprises:

sending, by the terminal, the power-off registration message to a mobile switching centre through a base station subsystem;

forwarding, by the mobile switching centre, the power-off registration message to a home location register through a visitor location register; and updating, by the home location register, in its local database, the state of the terminal to a power-off state.

3. The method according to claim 2, wherein the operation of the network side returning the calling party a prompt that the terminal has been powered off comprises:

under the circumstances that there is a voice or short message calling the terminal, inquiring, by the mobile switching centre, of the home location register about the state information of the terminal through the visitor location register;

checking, by the home location register, the local database, and returning the power-off state of the terminal to the mobile switching centre through the visitor location register; and returning, by the mobile switching centre, the calling party a prompt that the terminal has been powered off.

4. A terminal, which can be blocked from receiving incoming communications without being turned off, comprising:

a setup module, which is configured to instruct the terminal to send a power-off registration message to a network side without turning off the terminal, in response to a user's setting of a state of the terminal to be a no-disturbance state, in which the terminal remains in a power-on state, can normally initiate calls and send short messages and cannot receive incoming communication;

a user interface, through which a user accesses the setup module to set the state of the terminal to be the no-disturbance state;

a sending module, which is configured to send a power-off registration message to a network side to make a request for power-off registration, in response to the instruction from the setup module;

a scheduling module, which is configured to schedule the sending module to send the power-off registration message to the network side without turning off the terminal after the user completes making a telephone call or sending a short message through the terminal in the no-disturbance state; and a control module, which is configured to forbid the sending module to send registration messages to the network side except the power-off registration message after the terminal finishes the power-off registration process.

* * * * *